United States Patent
Hicks, Jr.

[11] 3,653,761
[45] Apr. 4, 1972

[54] OPTICAL SYSTEM

[72] Inventor: John Wilbur Hicks, Jr., P.O. Box 246, Sturbridge, Mass. 01566

[22] Filed: Mar. 10, 1970

[21] Appl. No.: 18,264

[52] U.S. Cl. ................................................................355/51
[51] Int. Cl. ...................................G03b 27/32, G03b 32/00
[58] Field of Search ..........................355/50, 51, 52; 350/175; 95/15

[56] References Cited

UNITED STATES PATENTS

| | | | |
|---|---|---|---|
| 3,212,401 | 10/1965 | Navias | 350/175 |
| 3,434,774 | 3/1969 | Miller | 350/175 X |
| 1,966,261 | 7/1934 | Petit | 95/15 |

FOREIGN PATENTS OR APPLICATIONS 1,453,771   8/1966   France.......................................355/50

OTHER PUBLICATIONS

J.O.S.A., Vol. 59, No. 11, Nov. 1969 page 1520.

Primary Examiner—John M. Horan
Attorney—Amster & Rothstein

[57] ABSTRACT

An optical system for use in a copy machine or the like is described as including an optical element for use with an image receiving medium and an image original medium such that an image from the image original medium is propagated through the element, lens inverted by the element, and mirror reversed by the element to impinge upon the image receiving medium.

11 Claims, 9 Drawing Figures

COPY

SINGLE LINE OF FIBER OPTIC DEVICES

ORIGINAL

PRIOR ART

INVENTOR.
JOHN W. HICKS, JR.
BY *Amster & Rothstein*
ATTORNEYS

INVENTOR.
JOHN W. HICKS, JR.
BY Amster & Rothstein
ATTORNEYS

OPTICAL SYSTEM

This invention relates primarily to optical devices and more particularly to such devices for use in an image transfer system to obtain a mirror reversal of a lens inverted image while propagating the image from an image original medium to an image receiving medium.

The basic purpose of an image transfer system or the like, such as those used for office copiers is to re-image information from an original to a copy. For instance, if one were to take a page to be copied and lay it over a photosensitive paper face-to-face, a copy could be made without any optics, but the copy would be a mirror image of the original. An apparatus which has been used to overcome this difficulty is shown in FIG. 1 as including a single line of image elements, such as fiber optic devices, for transporting the image of the original to the copy. The copy is then exposed with the mirror reversal in one dimension being achieved by scanning the original and copy in opposite directions. Although such a system provides the mirror reversal desired, it is very limited in speed of copying because only one line can be exposed at a time and the width of that line must be no greater than the resolution required, which is typically one or two thousandths of an inch. Moreover, both master and copy must be within a few thousandths of an inch of touching the fiber optics array. Such tolerances make it difficult to get illumination onto the master since back illumination is both inefficient and unsuitable for masters printed on both sides. Alternatively, two layers of fibers could be used with a cross-over between the ends thereof to achieve the reversal. In this way, the resolution is maintained and the exposure doubled but the cross-over is difficult with two sheets of fibers.

Accordingly, a primary object of the present invention is to provide an image transfer system for use as an office copier, or the like, which is compact, efficient, and capable of use with a convenient illumination system.

A further object of the present invention is to provide a novel image transfer system and device for producing desired reversal and inversion of an image while transferring the image from an image original medium to an image receiving medium.

These and other objects of the present invention are accomplished in accordance with one illustrative embodiment of the present invention by an optical device for use with a source of light in an image transfer system or the like and for providing a mirror reversal of a lens inversion of an image while propagating the image from an image original medium to an image receiving medium. The device includes an optical element having first, second, and third sides, the element also having an index of refraction which varies radially and substantially parabolically from an axial line coincident with the first side. The first side defines a mirror surface for reflecting images and light in a direction towards the aforementioned radial variation. A light source is used to reflect light from the image original medium through the third side of the element such that the image of the image original medium is propagated through the third side, reflected from the first side and propagated through the second side to impinge upon the image receiving medium.

The above brief description, as well as further objects, features and advantages of the present invention will be more fully appreciated by reference to the following detailed description of the preferred, but nonetheless illustrative embodiment when taken in conjunction with the accompanying drawings, wherein.

Figure 1:
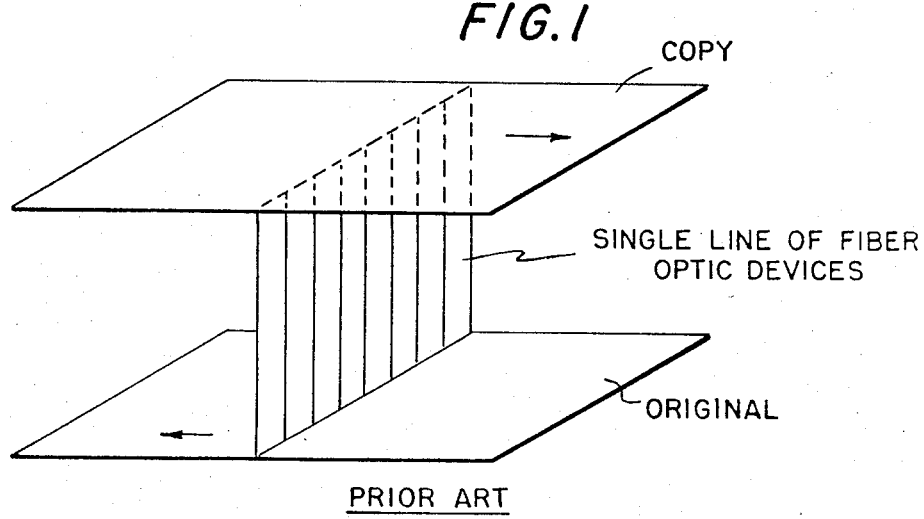
FIG. 1 is a schematic, front perspective view of an image transfer apparatus according to the prior art.
Figure 2:
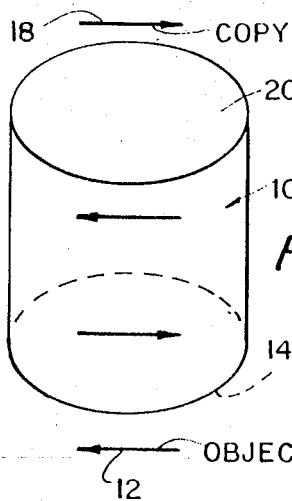
FIG. 2 is a schematic representation of the lens inverting action of a device useful in the construction of an optical element according to the present invention.
Figure 3:
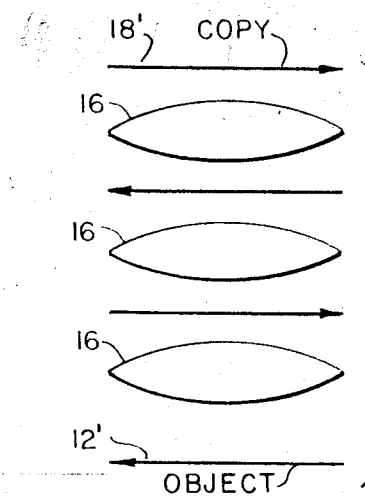
FIG. 3 is a schematic lens equivalent of the device of FIG. 2.
Figure 4:
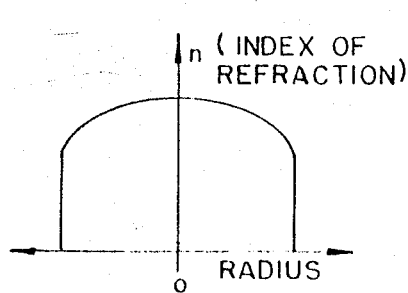
FIG. 4 is a graphical representation of the index of refraction variation in the device of FIG. 2.

A device useful in the construction of an optical element according to the present invention is shown schematically in FIGS. 2 through 4 as a rod 10 of glass material (other materials are also useful) whose index of refraction varies radially from center to circumference in a substantially parabolic distribution. The rod 10 has the property that an object 12 at or near the surface 14 will be imaged and re-imaged at intervals along the length of the rod 10 in much the same way as a series of lenses 16 would relay an image. Such a rod 10 may be recognized as comparable to the so-called "Luneberg" lens. The rod 10 is unsuitable for image transfer in an office copier or the like because none of the images is a mirror reversal of the original. Each copy image 18 is only a lens or radial inversion.

Such rods 10 do have the advantage of a finite working distance such that the object and image focal surfaces are not coincident with the end surfaces of the rod 14, 20. Therefore, if that working distance is sufficiently great, a mirror inversion may be achieved by forming a prism on the end of the rod (not shown) but the transverse passage caused by the folding would degrade imagery due to the non-uniform index of refraction. If the prism is placed on top of the rod, rather than bevelling the rod, a satisfactory solution is obtained, but for the paper flow path required (the copy paper plane would be at an angle to the original paper plane).

The rod 10 of FIG. 2 is available under the designation "Selfoc" marketed by Nippon Sheet Glass Co. of Japan. The designation may be a contraction or elision of "self-focus." The material, as stated previously, is one whose index of refraction varies radially from center to circumference in a substantially parabolic distribution and may be manufactured using a potash-alumina-silica glass rod of any convenient diameter such as 2 millimeters. The glass rod is placed in a sodium nitrate bath at 400° C. for approximately 30 days. During the bathing time, the soda of the sodium nitrate moves into the rod and at the same time the $K_2O$ of the rod moves out of the rod into the bath. The soda is of lower index and because of its direction of moving towards the center of the rod, it will be more abundant at the periphery of the rod than at its center. Conversely, the $K_2O$ is of higher index and because of its motion from the center of the rod, it will be more abundant at the center than at the periphery of the rod. Collectively, the above two processes of soda and $K_2O$ provides a higher index center for the rod and a lower index periphery, thereby producing the distribution of FIG. 4. Trial and error manufacturing techniques are used to obtain the desired substantially parabolic distribution. The rod used in the manufacturing process as described above may be of the following composition by weight percentage:

$SiO_2$ — 76 percent
$K_2O$ — 8 percent
$B_2O_3$ — 14 percent
$Al_2O_3$ — 2 percent Other ions can be exchanged as described above but the use of sodium nitrate and the potash-alumina-silica glass has proved to provide a rapid process when compared with the use of most other ions.

Figure 5:
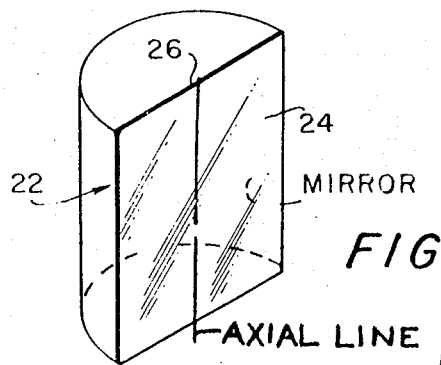
FIG. 5 is a perspective view of an optical element constructed by splitting the device of FIG. 2 and providing a mirror surface thereon.

A more desirable optical element may be achieved by splitting the rod 10 along its axis into two parts to produce the optical element 22 shown in FIG. 5. The cut surface 24 defined by the first side 26 of the optical element of FIG. 5 is made as a mirror surface for reflecting inwardly of the element to overcome the deficiency of the element of FIG. 2, which only provides a lens inversion and not a mirror reversal.

Figure 9:
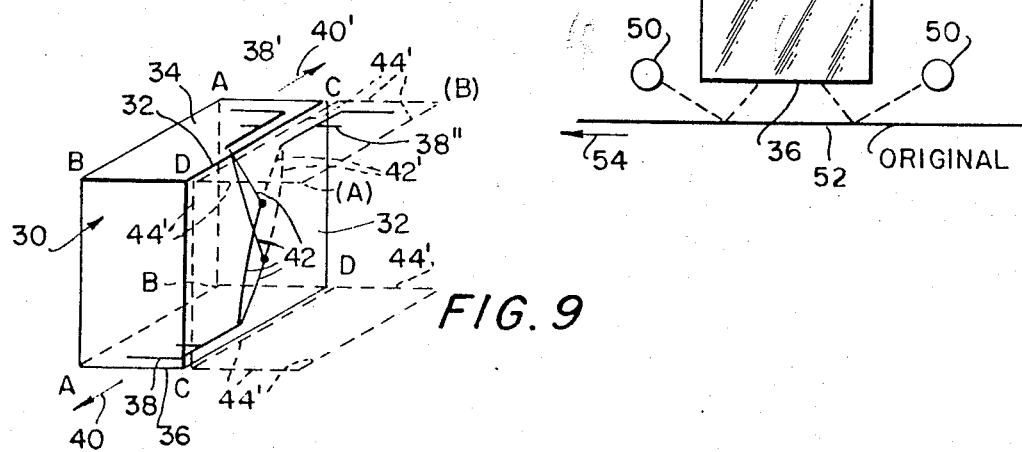
FIG. 9 is a schematic, front perspective view of a representation of the optical effects of splitting a device according to FIG. 2 to produce an optical element according to FIG. 5.

By squaring off the optical element of FIG. 5 to provide an optical element 30 as shown in FIG. 9, a desirable element for use in an image transfer system is thereby produced. The optical element 30 includes a first side 32 defining a mirror surface for reflecting inwardly of the element, a second side 34 for image output and a third side 36 for image input. Consider the letter F, designated with reference numeral 38, as the image input on the third side 36 and presume that the image to be transferred is traveling in a direction represented by the arrow 40. The image output will be the letter F, designated by the reference numeral 38', traveling in a direction represented by the arrow 40' on the second side 34. Such mirror reversal of a lens inverted image is provided by the index of refraction variation and the mirror surface used to construct the optical element 30. The optical action is illustrated by considering the lower point of the letter F with rays 42 propagating therefrom to the mirror surface defined by the first side 32. The rays 42 are reflected from the mirror surface to re-image as a mirror reversal of a lens inverted image representing by the letter F on the second side 34 of the optical element 30. The dotted rays 42' and the dotted lines 44' are shown in the drawing of FIG. 9 to illustrate the optical action that would have occurred using the unsplit device of FIG. 2. Examination of the letter F, designated by reference numeral 38'', that would have been produced with the unsplit device of FIG. 2 shows that only a lens inversion would have taken place; however, the use of the split optical element 30 with a mirror surface along the plane of the cut produces a mirror reversal letter F(38') of the lens inverted F(38'').

In order to insure the clarity of the foregoing explanation of optical action, further reference to FIG. 9 reveals that an image array ABCD on the third side 36 of the optical element 30 becomes a rearranged BADC image on the second side 34. If the device of FIG. 2 were used instead, as illustrated by the dotted element configuration 44 in FIG. 9, the image provided would be a DCAB lens inverted image instead.

Figure 6:
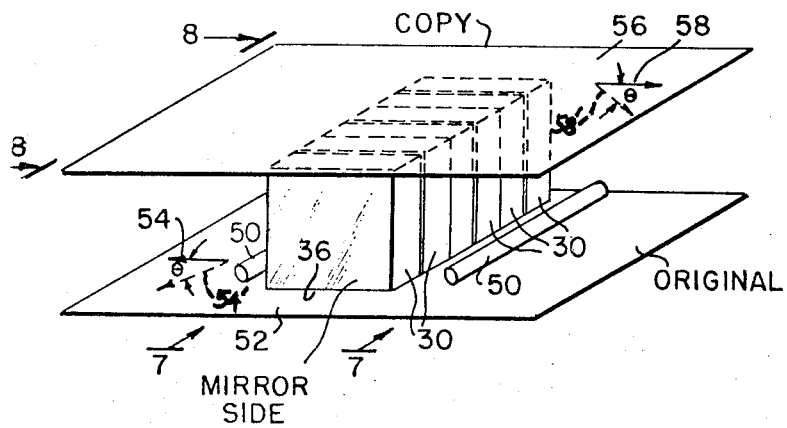
FIG. 6 is a front perspective schematic view of an image transfer system according to the present invention demonstrating the use of the optical element of FIG. 5.
Figure 7:
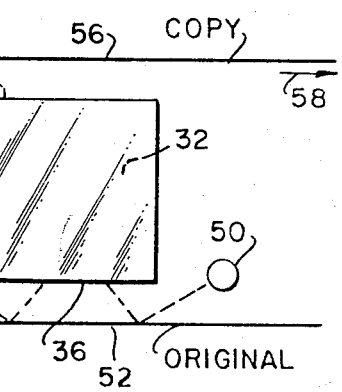
FIG. 7 is a schematic representation of the illumination system useful with an optical element according to FIG. 5.
Figure 8:
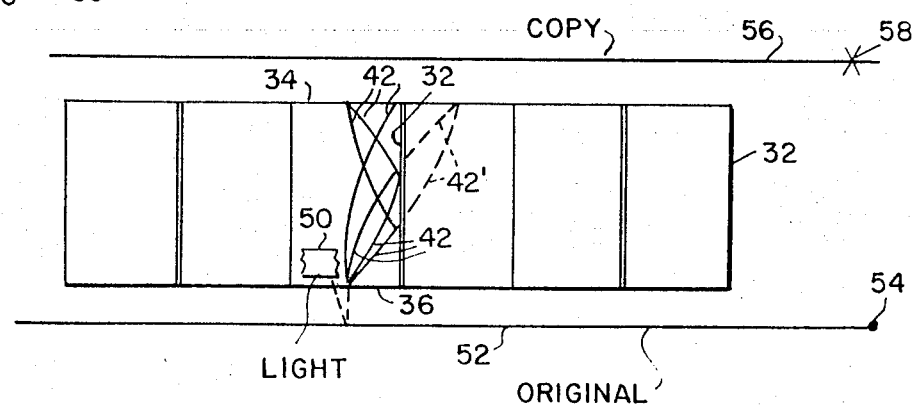
FIG. 8 is a side view of the image transfer system of FIG. 6 demonstrating the interrelationship of the illumination system of FIG. 7 and the construction of the optical element of FIG. 5.

By using a number of optical elements 30 (and with cutting planes defined by double lines), the illustration of FIG. 6 depicts a schematic representation of an image transfer system desirable for use as an office copier or the like. Light sources 50 are arranged to reflect light from the image original medium 52 with the light propagating through the third surface 36 into the optical elements 30 (FIGS. 6 through 8). A band scanner system is thereby produced which is similar to a line scanner but with extended width. The image original medium 52 is used with means (not shown) to transport the original image in a direction designated by the arrow 54. The image receiving medium 56, on the other hand, is used with means (not shown) to transport the copy image in a direction designated by the arrow 58. The system thereby provides an increase in exposure efficiency because a greater width of image is exposed at each instant. When compared with prior art devices, such increases far in excess of a hundred-fold can be obtained for a system using the optical element 30 and the arrangement as shown in FIGS. 6 through 8. Furthermore, the illumination efficiency is greatly enhanced by the finite working distance of the system allowing for illumination from below. By use of such illumination, dust, scratches, and grease on the end surface are prevented from back-scattering into the system. Furthermore, the finite working distance of such a system allows the image original medium 52 and the image receiving medium 56 to be held and traversed without the possibility of scratching the optics or jamming.

When compared with conventional folded optical systems, the system as shown according to the present invention would have the advantage that the optical system is greatly reduced in size and expense unless the prior art folded optical system is provided with a low numerical aperture optical arrangement. In such a case, however, the prior art system would be inefficient in its light collection.

Production of an image transfer system or the like according to the present invention is accomplished mechanically as a portable device that can be as small as a slide rule with a simple gear train to transmit the motion of a roller against the image original medium 52 and to draw the image receiving medium 56 in the opposite direction. Alternatively, a small motor could drive both. It is important that the three sides (one face plus top and bottom edges) of the optical element 30, other than the mirror side, be squared and furthermore, it is recognized that certain rays 52 in their natural trajectory will attempt to enter the material that has been removed. Such rays may be eliminated by roughening and blackening such surfaces, which may lead to "vignetting;" that is, not all areas of the second side 34 may be equally efficient in imaging. This problem may be eliminated by the use of high contrast copy paper or by a neutral density pattern which may be introduced to even out the image intensity.

In cases where extremely high quality is desired, any tendency to streak or band (because of the discrete construction of the pieced-together optics) may be eliminated by adjusting the angle of copy and original paper flow and orientation by angle $\theta$ (FIG. 6). The ground rules for such flow direction and orientation angular adjustments include:

1. The copy flow direction 58 and orientation 58' must differ angularly, if at all, by the same amount $\theta$ as the angular difference between original flow direction 54 and orientation 54'; and 2. The flow angular adjustment for the copy must equal the flow angular adjustment for the original.

The observation of the above ground rules is more easily understood by particular reference to FIG. 6 wherein orientation angular adjustment for the copy is designated by the reference numeral 58' and orientation angular adjustment for the original is designated by the reference numeral 54'. In both cases, the orientation angular adjustment is presumed to be in the planes of the image receiving medium and image original medium 56, 52, respectively, shown in the drawing of FIG. 6.

It should be understood that the image receiving medium 56 can be conventional photofilm or zinc oxide coated paper such that when such paper is charged negatively with electrons, exposed to light, impregnated with toner particles and heated, the image 38' is developed.

The word "light" as used herein means visible, ultraviolet or infrared parts of the electromagnetic energy spectrum.

It should also be understood that only half the rod of FIG. 2 (in height) may be used without splitting as previously described, to provide the basis for an embodiment using the third side of the device for both input and output [actually, the third side would then define input (third surface) and output (second surface) surfaces]. The mirror is at a horizontal plane at approximately the center (vertically) of the rod (or solid rectangle).

What is claimed is:

1. An optical device for use with a source of light comprising optical means defining first, second and third surfaces, said optical means having an index of refraction which varies from an axial line on said first surface, means on said first surface defining a mirror for reflecting light, said optical means being adapted to propagate light from a source of light to reflect from said first surface to said second surface after propagating through said third surface, said device being unitary and providing a mirror reversal of a lens inversion of an image proximate said third surface while transferring that image to proximate said second surface.

2. The invention according to claim 1 wherein said device includes a plurality of said optical means.

3. The invention according to claim 1 wherein said optical means includes a glass material and said index of refraction varies from said line substantially parabolically.

4. The invention according to claim 1 wherein said optical means includes an element whose index of refraction varies substantially parabolically from an axial line and a prism mounted at an end of said element.

5. An optical device for use with a source of light in an image transfer system or the like and for providing a mirror reversal of a lens inversion of an image onto an image-receiving medium from an image original medium comprising an optical element having first, second and third sides, said element also having an index of refraction which varies from a line coincident with said first side, means on said first side defining a mirror surface for reflecting light, said element being adapted to propagate light from a light source to reflect from said mirror surface to said second side after propagation through said third side, such that said light reflects from said image original medium before entering said element and said image from said image original medium is lens inverted and mirror reversed onto said image-receiving medium by said element after propagating through said third side and propagating through said second side.

* * * * *

UNITED STATES PATENT OFFICE
CERTIFICATE OF CORRECTION

Patent No. 3,653,761     Dated April 4, 1972

Inventor(s) John Wilbur Hicks, Jr.

It is certified that error appears in the above-identified patent and that said Letters Patent are hereby corrected as shown below:

Column 6, after line 11, insert the following claims:

5. An optical device for use with a source of light in an image transfer system or the like and for providing a mirror reversal of a lens inversion of an image onto an image-receiving medium from an image original medium comprising an optical element having first, second and third sides, said element also having an index of refraction which varies from a line coincident with said first side, means on said first side defining a mirror surface for reflecting light, said element being adapted to propagate light from a light source to reflect from said mirror surface to said second side after propagation through said third side, such that said light reflects from said image original medium before entering said element and said image from said image original medium is lens inverted and mirror reversed onto said image-receiving medium by said element after propagating through said third side and propagating through said second side.

UNITED STATES PATENT OFFICE
CERTIFICATE OF CORRECTION

Patent No. 3,653,761     Dated April 4, 1972

Inventor(s) John Wilbur Hicks, et al.     Page - 2

It is certified that error appears in the above-identified patent and that said Letters Patent are hereby corrected as shown below:

6. The invention according to claim 5 wherein a plurality of said optical elements is provided in said optical device.

7. The invention according to claim 5 wherein means are provided for imparting motion in one direction to said image receiving medium and further means are provided for imparting motion in the opposite direction to said image original medium.

8. The invention according to claim 7 wherein said device further comprises a source of light including a pair of elongated light emitting members, disposed in a direction transverse to said directions of motion.

9. The invention according to claim 6 wherein said plurality of optical elements are solid rectangles in shape with said first sides being disposed in a plane perpendicular to the planes of said media.

UNITED STATES PATENT OFFICE
CERTIFICATE OF CORRECTION

Patent No. 3,653,761         Dated April 4, 1972

Inventor(s)   John Wilbur Hicks, Jr.         Page - 3

It is certified that error appears in the above-identified patent and that said Letters Patent are hereby corrected as shown below:

10. The invention according to claim 8 wherein said third side is spaced from said image original medium.

11. The invention according to claim 10 wherein said second side is spaced from said image receiving medium.

Signed and sealed this 7th day of November 1972

(SEAL)
Attest:

EDWARD M. FLETCHER, JR.          ROBERT GOTTSCHALK
Attesting Officer                Commissioner of Patents